June 4, 1935.  L. H. THOEN  2,003,522
THRESHING
Filed Dec. 27, 1930   5 Sheets-Sheet 2

INVENTOR.
Lowell H. Thoen
BY
ATTORNEYS.

June 4, 1935.  L. H. THOEN  2,003,522
THRESHING
Filed Dec. 27, 1930  5 Sheets-Sheet 4

INVENTOR.
Lowell H. Thoen
BY
ATTORNEYS.

June 4, 1935.   L. H. THOEN   2,003,522
THRESHING
Filed Dec. 27, 1930   5 Sheets-Sheet 5

INVENTOR.
Lowell H. Thoen
BY
ATTORNEYS.

Patented June 4, 1935

2,003,522

UNITED STATES PATENT OFFICE 2,003,522

THRESHING

Lowell H. Thoen, San Leandro, Calif., assignor to Caterpillar Tractor Co., San Leandro, Calif., a corporation of California Application December 27, 1930, Serial No. 505,076

11 Claims. (Cl. 130—27)

My invention relates to threshing machines and particularly to a threshing machine adapted to thresh beans. The objects of my invention are, first, to provide a threshing machine with primary and secondary threshers; second, to provide a thresher comprising co-acting toothed cylinders.

Figure 1:
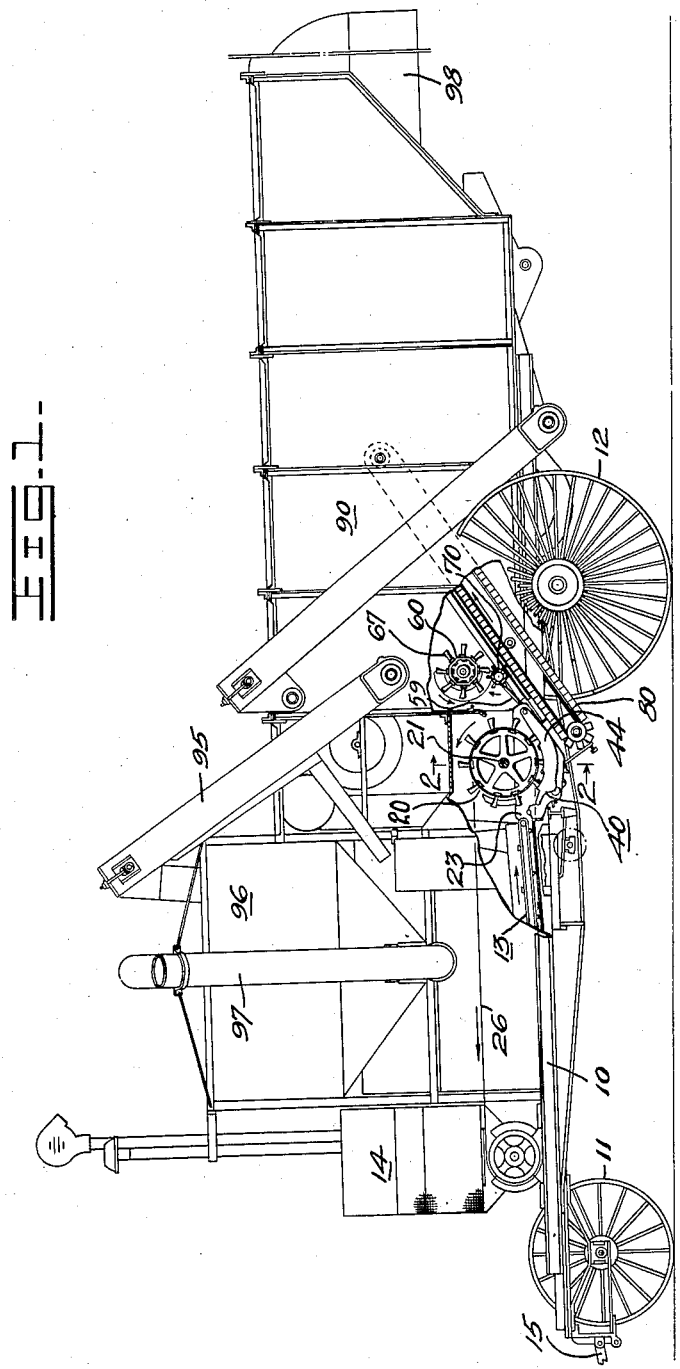
Figure 2:
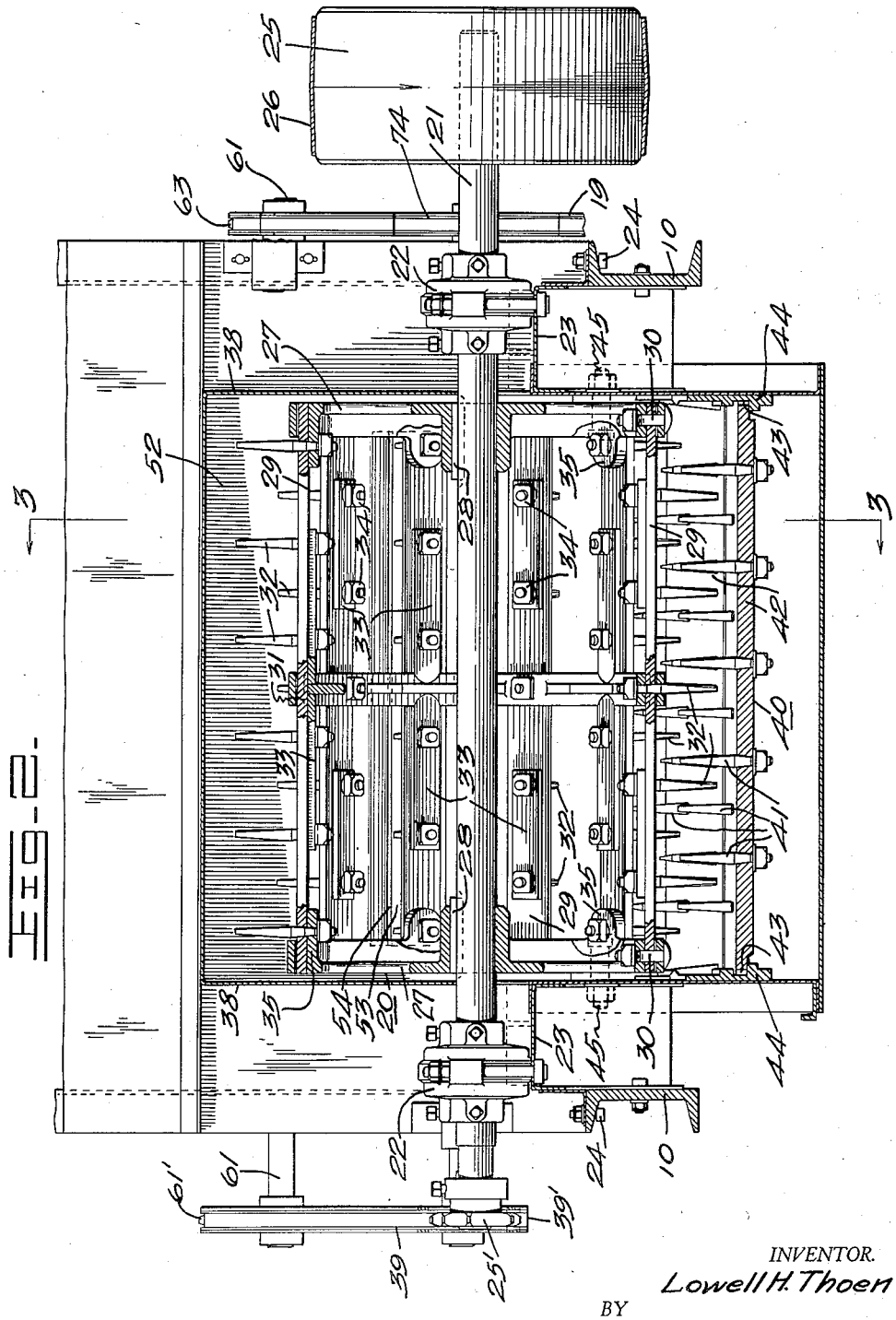
Figure 3:
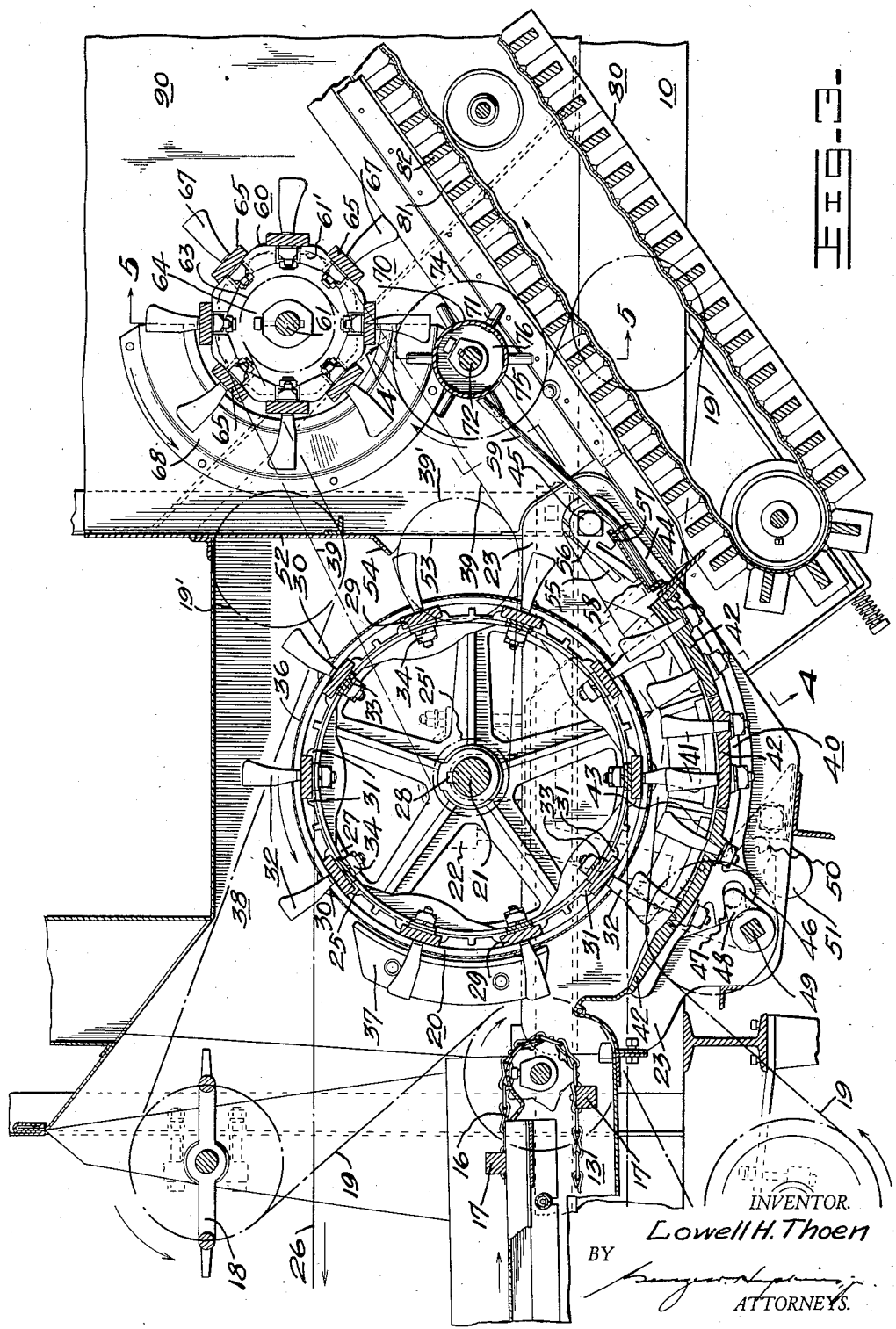
Figure 4:
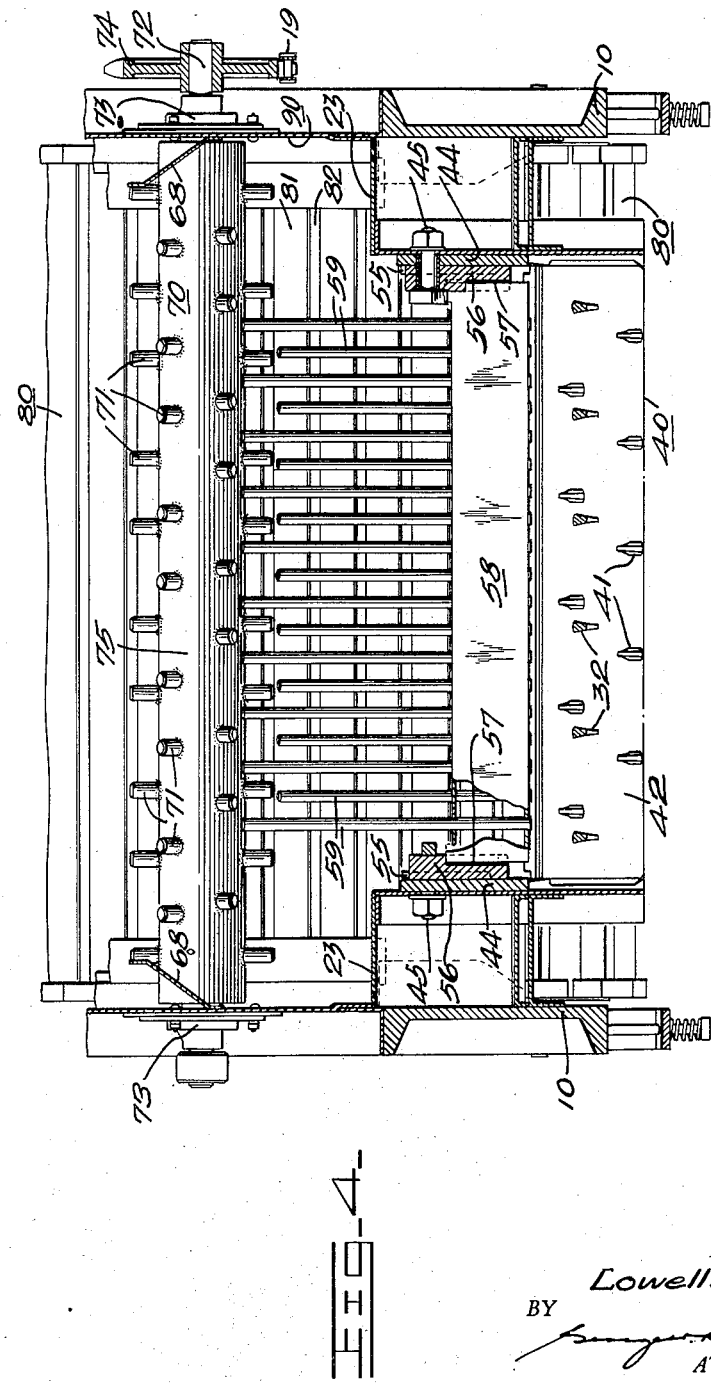
Figure 5:
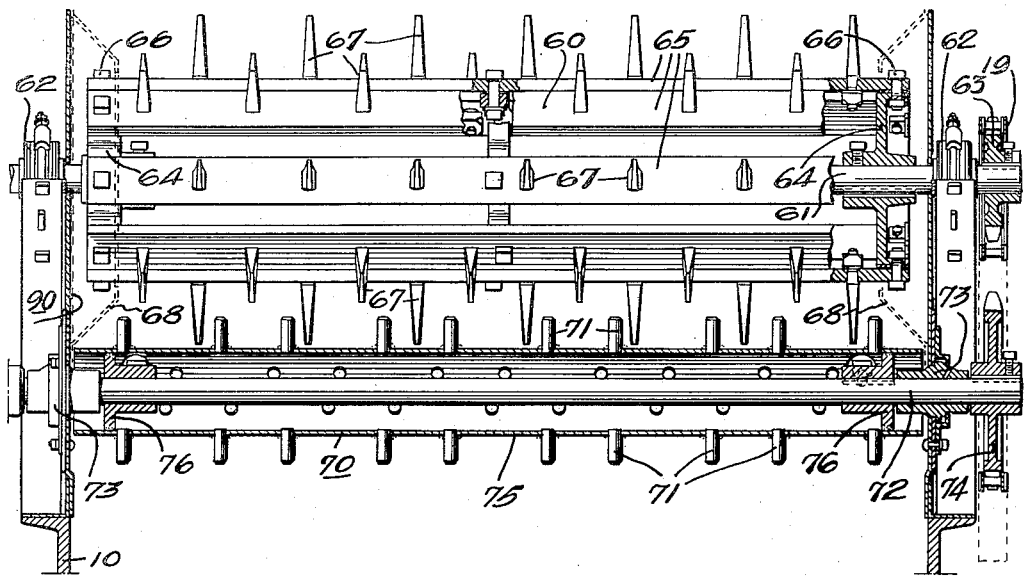
Figure 6:
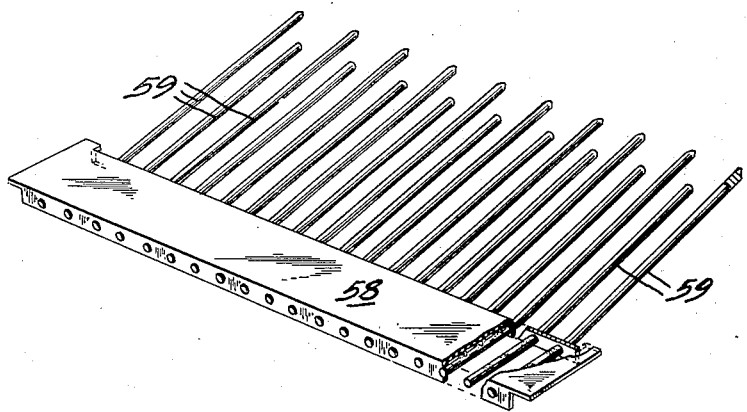

Fig. 1 is a left side elevation of a machine embodying the invention with parts broken away.
Fig. 2 is a sectional view on line 2—2 of Fig. 1.
Fig. 3 is a sectional view on line 3—3 of Fig. 2.
Fig. 4 is a sectional view on line 4—4 of Fig. 3.
Fig. 5 is a sectional view on line 5—5 of Fig. 3.
Fig. 6 is a detail perspective view of the grate.

The invention is shown embodied in a combined harvester thresher provided with the usual main frame 10, front steering wheels 11, rear wheels 12, and a pick-up not shown. The machine disclosed for purposes of illustration is particularly adapted for handling beans but it is to be understood that the invention is not limited to this use. The cut vines are delivered from the pick-up to feeder 13 which is driven in the direction of the arrow in Fig. 1. The vines are fed into a primary thresher comprising cylinder 20 and concave 40 and discharged onto grate bars 59 which extend into separator compartment 90 to a secondary thresher comprising cylinders 60 and 70. The beans are received in the cells of grain carrier 80 and are carried away and cleaned by well known processes and when finally cleaned are conveyed by elevator 95 to bin 96 from which they may be removed as desired by means of auger 97. The vines and pods are discharged at the tail 98.

The various working parts of the machine are driven by auxiliary motor 14 although power may be taken directly from the tractor if desired. The machine is equipped with the usual drawbar 15 for draft connection to a tractor.

Feeder 13 comprises parallel chains 16 to which are fastened cross-bars 17. Co-operating with feeder 13 is beater 18 which is driven by a sprocket chain arranged as indicated by the dot-and-dash line 19 (Fig. 3) to drive other parts, including feeder 13, and to be driven by cylinder 60. Chain 19 is tensioned by idler 19'.

Cylinder 20 is mounted on shaft 21 which is supported in bearings 22 bolted to sub-frame 23 which in turn is bolted at 24 to main frame 10. Shaft 21 Fig. 2 is provided at its right end with pulley 25 for belt 26 which is driven by motor 14, and at its left end with sprocket 25' for driving sprocket 61' for cylinder 60 through chain 39, which is tensioned by idler 39'. Cylinder 20 comprises two end wheels 27 fastened by keys 28 to shaft 21 as shown in Fig. 2. Bars 29 are secured by bolts 30 to wheels 27, and are further positioned thereon by means of lugs 31 formed in the rim of each wheel as shown in Fig. 3. Each bar 29 is apertured to receive teeth 32 which have tapered shanks and which extend through reinforcing strips 33 to receive securing nuts 34. The teeth adjacent the wheels 27 are reinforced by lugs 35 formed in the rim of each wheel as shown in Fig. 2. The cylinder is covered with a sheet of metal 36 which is suitably apertured to receive teeth 32 and serves to prevent entangling vines entering into the cylinder. The vines are prevented from getting around the ends of the cylinder by guards 37 which are fastened to the side walls 38 of the primary thresher compartment.

Co-operating with cylinder teeth 32 are concave teeth 41 which are mounted in segmental plates 42 as shown in Figures 2 and 3. The ends of plates 42 are inserted in arcuate slots 43 on the inner side of supporting arms 44 which are pivoted in sub-frame 23 at 45. The front end of each arm 44 is provided with a jaw 46 to receive crank pin 47 on crank 48. The cranks 48 are operated by square shaft 49 which extends through sub-frame 23 where it is provided with segmental ratchet 50 and an operating crank not shown. Detent 51 co-operates with ratchet 50 to maintain the crank adjustment. By this means the concave and its teeth 41 can be adjusted about pivots 45 to position teeth 41 with respect to cylinder 20.

Rear wall 52 of the primary thresher compartment is apertured at 53 to permit discharge of the threshed beans into separator compartment 90. The wall 52 at the upper edge of aperture 53 is flared inwardly at 54 to prevent return of the material into the primary thresher compartment. The rear end of each arm 44 is provided with parallel ridges 55 which serve to prevent rotation of block 56 on pivot 45 relative to arm 44. Block 56 is slotted at 57 to receive the end of plate 58, the other end of plate 58 being supported in the other block 56. Plate 58 is channel-shaped in section as shown in Fig. 3 and forward depending web bears against the rear edge of the rearmost concave plate 42. The downwardly projecting webs are apertured to receive grate bars 59 as shown in Fig. 6. These bars extend rearwardly into separator compartment 90 and upwardly toward cylinder 70 which is provided with teeth 71. It will be noted in Figures 3, 4, and 6 that the grate is made up of alternately long and short bars 59, the long bars extending to the surface of cylinder 70, the short bars being in line with teeth 71 which just clear the end of the bars as cylinder 70 rotates.

The threshed material is discharged through opening 53 onto grate bars 59 from which it is picked up by cylinder 79 and fed between cylinders 60 and 70 which are rotated so that their peripheral speeds are different. Cylinder 60 is mounted on shaft 61 which is supported in bearings 62 fastened to the frame work of the machine. The right end of shaft 61 in Figure 5 is provided with sprocket 63 to drive chain 19. Cylinder 60 comprises end wheels 64. The rim of each wheel is octagonal as shown in Fig. 3 thereby providing flat surfaces for attaching the ends of bars 65 by bolts 66. Bars 65 are provided with teeth 67 which co-operate with teeth 71 in cylinder 70 as particularly shown in Fig. 5. Cylinder 70 comprises a cylindrical body 75 supported on discs 76 the hubs of which are keyed to shaft 72 (Fig. 5) which is supported in bearings 73 in the side walls of compartment 90. One end of shaft 72 is provided with sprocket 74 for driving by chain 19. The cylindrical body 75 of cylinder 70 is pierced to receive teeth 71 as will readily appear from Figs. 4 and 5. Material is prevented from passing around the end of cylinder 60 by guards 68 which are fastened to the side walls of separator compartment 90.

The threshed material is discharged from the secondary thresher onto the grain carrier 80, the beans lodging in cells 81 and the vines resting on the upper edge of slats 82 in the well known manner. The beans are then cleaned and deposited in the bin 96 and the vines and pods are discharged at 98.

I, therefore claim as my invention:

1. In a threshing machine, a rotary toothed cylinder, and a screening device cooperating with said cylinder and including a plurality of spaced members, some of said members extending between teeth on said cylinder and adjacent the periphery of said cylinder and other of said members extending adjacent only the teeth on said cylinder.

2. In a threshing machine, a primary thresher, a grate comprising a plurality of spaced apart bars extending from said primary thresher, alternate bars being longer than the bars intermediate said alternate bars, a secondary thresher positioned adjacent ends of said bars, said secondary thresher comprising a plurality of rotatable toothed cylinders, the teeth on one of said cylinders being adapted to fit between the alternate bars, and means for rotating said one cylinder in a direction to pick up material from said bars and to feed material between it and another of said cylinders.

3. In a threshing machine, a primary thresher, a grate comprising a plurality of spaced apart bars extending from said primary thresher, alternate bars being longer than the bars intermediate said alternate bars, a secondary thresher positioned adjacent ends of said bars, said secondary thresher comprising a plurality of rotatable cylinders having interengaging teeth, the teeth on one of said cylinders being adapted to fit between the alternate bars, and means for rotating said one cylinder in a direction to remove material from said bars and to feed said material between it and another of said cylinders.

4. A bean thresher comprising a primary thresher including a cylinder and a concave, a grate comprising a plurality of spaced apart bars extending from said concave, alternate bars being longer than the bars intermediate said alternate bars, a secondary thresher positioned adjacent ends of said bars, said secondary thresher comprising a plurality of rotatable cylinders having interengaging teeth, the teeth on one of said cylinders being adapted to fit between the alternate bars, means for rotating said one cylinder in a direction to remove material from said bars and to feed said material between it and another of said cylinders, and an endless conveyor positioned below said grate and the secondary thresher.

5. In a threshing machine having a thresher unit including a stationary toothed concave and a rotatable toothed cylinder, means adapting said machine for the threshing of beans, comprising a second thresher unit adapted to receive material from said first-mentioned unit and including a plurality of oppositely rotatable cylinders having interengaging teeth, the cylinders of the second unit being positioned one over the other with the lower cylinder of smaller diameter than the upper cylinder.

6. In a threshing machine having a thresher unit, means adapting said machine for the threshing of beans, comprising a second thresher unit adapted to receive material from the first-mentioned unit and including a plurality of cooperating rotatable cylinders having interengaging teeth, the cylinders of the second unit being positioned one over the other with the lower cylinder of smaller diameter than the upper cylinder, and means for rotating said second thresher cylinders at a constant speed relationship and in opposite directions.

7. In a threshing machine, threshing mechanism comprising a plurality of rotatable cylinders having interengaging teeth and positioned one over the other, the upper cylinder being of larger diameter than the lower cylinder, the teeth on the upper cylinder being substantially flat-sided threshing blades and the teeth on the lower cylinder being studs, and means for rotating said cylinders in opposite directions and at different tooth speeds.

8. In a threshing machine, a primary thresher including a rotatable cylinder, a secondary thresher adapted to receive material from said primary thresher and including a plurality of rotatable cylinders having interengaging teeth, power means for rotating the primary thresher cylinder, means including an endless chain for rotating one of the secondary thresher cylinders from said primary thresher cylinder, other rotatable mechanism, and means including an endless chain for rotating another of said secondary thresher cylinders and said other mechanism from said one secondary thresher cylinder, whereby the cylinders and other mechanism are driven at a constant speed relationship.

9. In a threshing machine, threshing mechanism comprising a primary thresher, and a secondary thresher including a plurality of rotatable cylinders, one of said cylinders serving to transfer material from the primary thresher, said one cylinder comprising a rotatable shaft and a tube secured for rotation with said shaft, said tube being pierced to receive threshing studs secured thereto, another of said cylinders of said secondary thresher being of larger diameter than said one secondary thresher cylinder and having threshing blades formed with cutting edges adapted to interengage with the studs on said one cylinder.

10. In a threshing machine, threshing mechanism including a cylinder and a concave having spaced arms, each of said arms being formed with converging slots, a grate including a plurality of bars extending from said concave and a member supporting the bars, the member being seated in selected slots to provide a predetermined angular positioning for said bars.

11. In a threshing machine, a thresher housing, a separator housing, a thresher including a rotatable toothed cylinder and a stationary toothed concave mounted in said thresher housing, a feeder for feeding material to the thresher in the thresher housing, a second thresher adapting said machine for the threshing of beans and mounted in said separator housing, said second thresher including a pair of cylinders having interengaging teeth and rotatable in opposite directions, one of said second cylinders serving to feed material from the first-mentioned thresher between it and the other of said secondary thresher cylinders, a grate between the concave of the first-mentioned thresher and the feed cylinder of the second thresher, an interrelated driving connection for rotating all of said cylinders at a constant speed relationship and for rotating the second thresher cylinders at different tooth speeds, and a cell belt positioned below said grate and below the second thresher to receive kernels threshed by the primary thresher which fall through said grate and also to receive kernels threshed by said second thresher.

LOWELL H. THOEN.